US011358443B2

(12) United States Patent
Tosetto et al.

(10) Patent No.: US 11,358,443 B2
(45) Date of Patent: Jun. 14, 2022

(54) PROTECTIVE SCREEN FOR GLASSES OF VEHICLES

(71) Applicants: PARTS SOLUTION S.R.L., Rome (IT); GRUPPO TOSETTO S.R.L., Cittadella (IT)

(72) Inventors: Innocente Tosetto, Cittadella (IT); Lorenzo Perricone, Rome (IT)

(73) Assignees: PARTS SOLUTION S.R.L., Rome (IT); GRUPPO TOSETTO S.R.L., Cittadella (IT)

( * ) Notice: Subject to any disclaimer, the term of this patent is extended or adjusted under 35 U.S.C. 154(b) by 0 days.

(21) Appl. No.: 16/649,328

(22) PCT Filed: Sep. 20, 2018

(86) PCT No.: PCT/IB2018/057264
§ 371 (c)(1),
(2) Date: Mar. 20, 2020

(87) PCT Pub. No.: WO2019/058306
PCT Pub. Date: Mar. 28, 2019

(65) Prior Publication Data
US 2020/0276886 A1    Sep. 3, 2020

(30) Foreign Application Priority Data
Sep. 20, 2017  (IT) ................. 102017000104871

(51) Int. Cl.
*B60J 1/20* (2006.01)
*B60J 11/08* (2006.01)
*B60R 21/12* (2006.01)

(52) U.S. Cl.
CPC ............. *B60J 1/2094* (2013.01); *B60J 11/08* (2013.01); *B60R 21/12* (2013.01)

(58) Field of Classification Search
CPC ........ B60J 1/2094; B60J 1/085; B60J 1/2011; B60J 1/2091; B60J 11/08; B60R 21/12; B60R 21/06
(Continued)

(56) References Cited

U.S. PATENT DOCUMENTS 2,614,630 A * 10/1952 Moszelt ................... B60J 11/08
160/370.21
3,024,717 A *  3/1962 Rozek ...................... F24F 7/00
454/275

(Continued)

FOREIGN PATENT DOCUMENTS

CN          2712694 Y      7/2005
CN       107310363 A     11/2017
(Continued)

OTHER PUBLICATIONS

International Search Report and Written Opinion, dated Jan. 30, 2019, for the corresponding International Application No. PCT/IB2018/057264 in 12 pages.

*Primary Examiner* — D Glenn Dayoan
*Assistant Examiner* — Kevin P Weldon
(74) *Attorney, Agent, or Firm* — Thomas | Horstemeyer, LLP

(57) ABSTRACT

Various embodiments of a protective screen for windows of vehicles are described. The protective screen for windows of vehicles includes a flexible protective sheet including a vehicle fastener. The flexible protective sheet includes: a first outer layer, resistant to heat and cold, mechanical and chemical stresses, UV ray-shielding and having fastness to light, a second layer made of thermally insulated fabric, designed to face a window.

26 Claims, 8 Drawing Sheets

(58) Field of Classification Search
USPC ....... 296/95.1, 97.7, 136.01, 136.02, 136.08, 296/136.1, 136.12, 136.13
See application file for complete search history.

(56) References Cited

U.S. PATENT DOCUMENTS

| | | | | |
|---|---|---|---|---|
| 3,670,798 | A * | 6/1972 | Hess | B60J 1/2011 160/354 |
| 4,209,197 | A | 6/1980 | Fischer | |
| 4,406,320 | A * | 9/1983 | Bingham | B60J 11/08 160/370.21 |
| 4,867,216 | A | 9/1989 | McKee | |
| 4,993,471 | A * | 2/1991 | Golden | B60J 1/2011 160/368.1 |
| 5,037,156 | A * | 8/1991 | Lundberg | B60J 11/08 296/95.1 |
| 5,292,167 | A * | 3/1994 | Hellman | B60J 11/08 150/168 |
| 5,738,403 | A * | 4/1998 | Tyson | B60J 11/00 296/136.02 |
| 7,044,532 | B2 * | 5/2006 | Yang | B60J 11/00 150/166 |
| 9,150,088 | B2 * | 10/2015 | Yang | B60J 11/08 |
| 9,676,262 | B2 * | 6/2017 | Peries | B60J 11/08 |
| 2007/0176458 | A1 * | 8/2007 | Graham | B60J 11/08 296/95.1 |
| 2009/0301671 | A1 | 12/2009 | Locklear | |
| 2012/0247025 | A1 | 10/2012 | El-Segal | |
| 2014/0182795 | A1 * | 7/2014 | Singleton | B60J 11/08 160/370.21 |
| 2015/0101768 | A1 * | 4/2015 | Lee | B60J 1/2091 160/370.21 |
| 2015/0114533 | A1 * | 4/2015 | Peries | B60J 11/08 150/168 |

FOREIGN PATENT DOCUMENTS

| | | | | |
|---|---|---|---|---|
| EP | 1405748 | A1 | 4/2004 | |
| KR | 20100107643 | A * | 10/2010 | |
| PT | 107267 | A | 5/2015 | |
| WO | WO-03016102 | A1 * | 2/2003 | ............ B60R 21/08 |
| WO | 2017125847 | A2 | 1/2017 | |

\* cited by examiner

PROTECTIVE SCREEN FOR GLASSES OF VEHICLES

The present invention relates to a protective screen for vehicle windows.

The screen is particularly applicable for windows of military vehicles or armed forces, however it may also be used for windows of aircraft and boats.

Tactical military vehicles are currently known and common (such as for example the Lince vehicle by Iveco) having extreme mobility and agility, made to operate in radically different environments due to geographical location, weather conditions and characteristics of the ground, in the presence of temperatures which may vary from +58° to −32° C.

The windows of a similar vehicle generally consist of a combination of glass sheets made of polycarbonate, polymethyl methacrylate, hard polyurethane and polyethylene, with insertions made of plastic material, such as polyvinyl butyral or polyurethane or ethylene-vinyl-acetate.

The use of the laminated windshield, as well as of laminated side and rear windows, if any, is preferable for safety reasons because there is—due to the presence of the insertions—less probability of the release of fragments of material upon a strong impact such as may be caused by a shot from a firearm or a fragment of an explosive device or from a generic body projected following an explosion.

The stratified window is highly resistant from a mechanical viewpoint, but very delicate from a chemical viewpoint, in particular with regards to resistance to UV rays. This is a serious limitation associated with the fact that the window may break or be deformed if exposed for lengthy periods to medium-to-high temperatures and to UV rays due to the lack of the perfect functionality of the insertions between the sheets; consequently, the transparency and clarity of the crystal glass could be compromised, thus putting in danger the driver operator; moreover, there is an increased probability of release of fragments of material upon a strong impact, with subsequent proportionally increased risks for the persons inside the vehicle.

It is the task of the present invention to make a protective screen for vehicle windows, and in particular for windows of military vehicles, capable of preventing the breaking and deformations of a stratified window of a vehicle exposed for lengthy periods to medium-to-high temperatures.

Within the scope of such a task, it is an object of the invention to fine-tune a protective screen which is easy to be positioned in use to cover the windows of a vehicle and which is just as easy to be removed.

It is another object of the invention to fine-tune a protective screen which can be stored with reduced volume.

This task, and also these and other objects which are more apparent below, are achieved by a protective screen for vehicle windows, and in particular for windows of military vehicles, according to claim 1, optionally provided with one or more features of the dependent claims.

Further features and advantages of the invention shall become more apparent from the description of a preferred, but not exclusive, embodiment of the protective screen according to the invention disclosed by way of non-limiting, indicative example, in the accompanying drawings, in which.

With reference to the mentioned figures, a protective screen for vehicle windows, and in particular for windows of military vehicles, is indicated as a whole with number 10. In particular, according to an advantageous embodiment, the protective screen 10 is a protective screen for protecting ballistic windows, and more preferably ballistic windows of military vehicles, from solar radiation. As is known, ballistic windows are multi-layer windows which typically comprise a combination of glass sheets made of polycarbonate, polymethyl methacrylate, hard polyurethane and polyethylene, with insertions made of plastic material, such as polyvinyl butyral or polyurethane or ethylene-vinyl-acetate.

Figure 1:
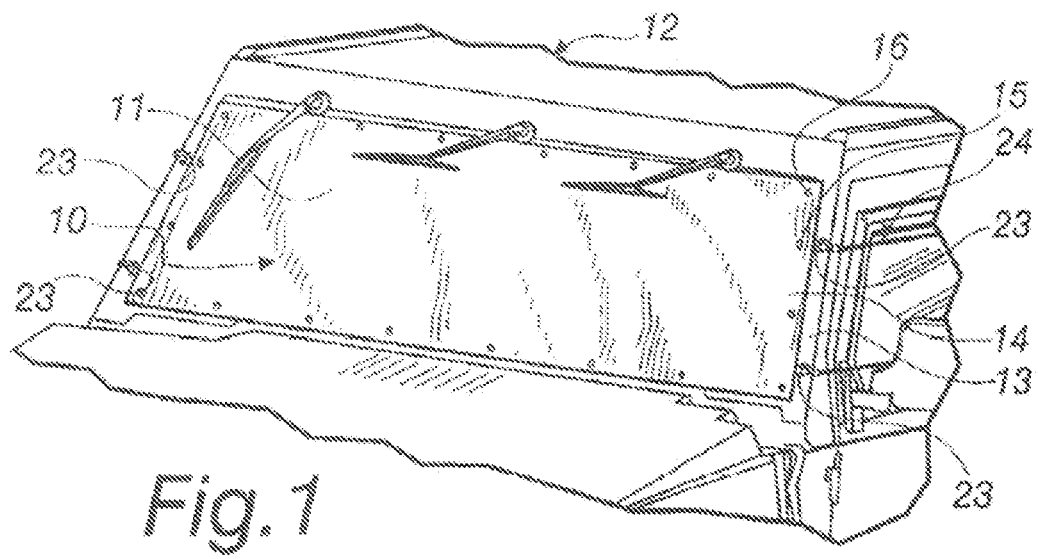
FIG. 1 shows a perspective view of a screen according to the invention, applied to a windshield of a military vehicle.
Figure 2A:
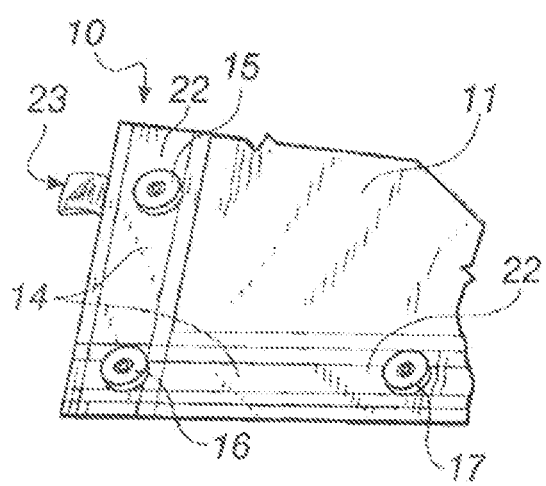
FIGS. 2 and 3 depict various perspective views of a corner portion of a screen according to the invention and a detail of a fastening element of a screen according to the invention.
Figure 2B:
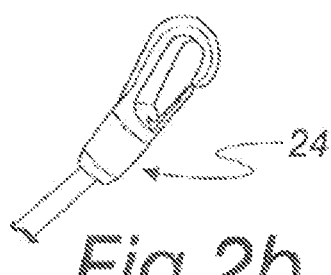
Figure 3:
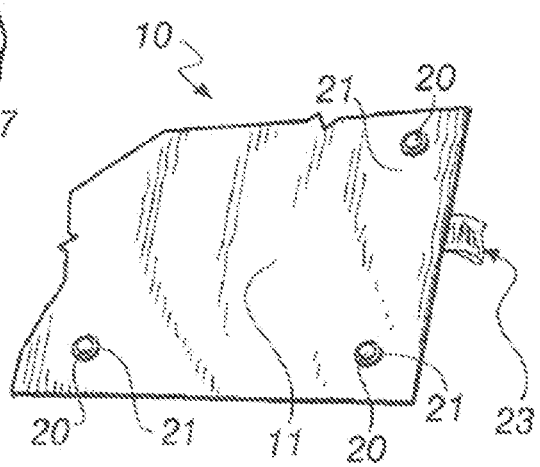

Said protective screen 10, which is depicted by way of example in FIG. 1 as prepared on a windshield of a tactical military vehicle 12, comprises: a flexible protective sheet 11.

There are, on the peripheral flap 14 of said protective sheet 11, magnetic bodies 15, 16, 17 for connection with a metal frame 13 of a window, for example of a military vehicle 12.

The magnetic bodies 15, 16, 17 each consist of a discoidal permanent magnet, for example made of neodymium.

In the non-limiting example embodiment herein described of the protective screen 10 according to the invention, such magnetic bodies 15, 16, 17 are each fastened to the peripheral flap 14 of the protective sheet 11 by means of a rivet 18 passing through a corresponding through hole defined on the peripheral flap 14 and through a through hole made on the magnetic body 15, 16, 17.

A first widened end 19 of rivet 18 is in contact with the magnetic body 15, while the opposite second widened end 20 is positioned on the opposite side of the protective sheet 11, there being interposed, between such a protective sheet 11 and the second widened end 20, a tear-proof ring 21 for protecting the protective sheet 11 from the rubbing against the second metal end 20 of the rivet 18.

Flap 14 has a reinforcing strip 22, for example fastened according to a technology of known type, for example sewn or heat sealed.

Such a reinforcing strip 22 strengthens the peripheral flap 14, thus making the fastening of the magnetic bodies 15, 16, and 17 firmer and more secure by means of riveting.

Said protective screen 10 may also have a plurality of slots 23 arranged on the outer edge of flap 14. Said slots 23 are adapted to insert tie-rod elements 24. These tie-rod elements are in themselves known and consist of for example, elastic cords having couplers and/or end hooks 24. Said tie-rod elements 24 may be anchored to the slots 23 of screen 10 on one side and to elements of the body of vehicle 12 on the other side.

The use of said tie-rod elements 24 ensures an improved fastening of screen 10 to the windows of vehicle 12 under particularly adverse weather conditions such as for example, in the case of sustained wind.

The use of the protective screen 10 according to the invention requires the orderly application of the magnetic bodies 15, 16, 17 to the metal frame 13, made of iron or iron alloy or other metal material on which the magnetic bodies may perform their attractive force.

Said protective screen 10 is dimensioned so as to completely involve a window or windshield which is intended to be covered.

The magnetic bodies 15, 16 and 17 substantially are distributed over the whole peripheral flap 14.

The protective screen 10 is easy to be folded when not in use due to the flexible sheet 11 and therefore may be stored with little volume. The same applies for the tie-rod elements 24.

The protective screen according to the invention may be made multicolor due to the plastic material coating by conveniently making such a coating by means of the use of catalyzed water paints suitable for infrared masking, for example with camouflage type color combinations, for example green and brown, white and brown and other similar combinations.

Each protective screen according to the invention may be customized on the coating itself, for example by identifying the vehicle license plate to which the screen itself is applied.

Figure 4:
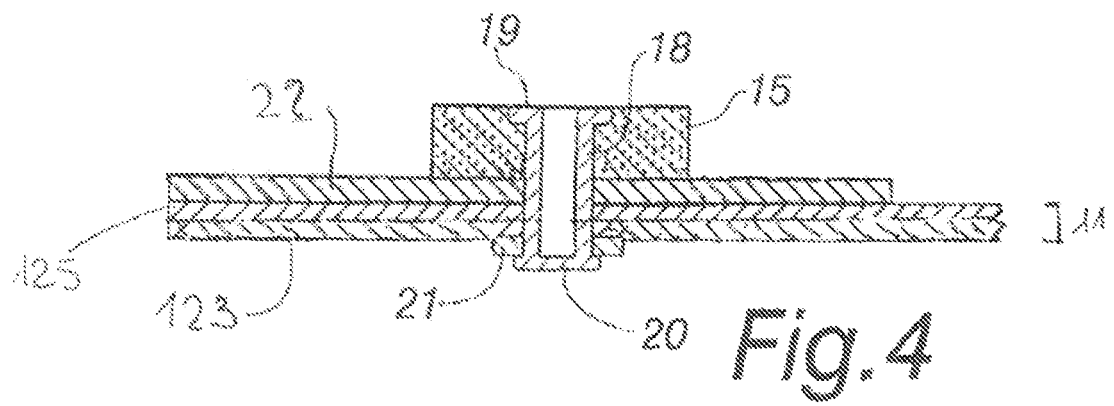
FIG. 4 depicts a sectioned side view of a detail of a protective screen according to the invention.

With reference to FIG. 4, the objective of said protective sheet 11 is to protect the window of the means in a special manner and to prevent the heat of the sun and the ultraviolet rays from damaging it.

Sheet 11 comprises:
- a first outer layer 123, resistant to heat/cold, mechanical and chemical stresses, UV ray-shielding and having fastness to light,
- a second layer 125 made of thermally insulated fabric, designed to face a window.

The first layer 123 may consist of, by way of non-limiting example, an elastomeric protective technical fabric, such as that known as "Tessuto tecnico 5186371 verde nero" (Green-black technical fabric 5186371) from Novurania, which substantially has, among others, features of:
- mechanical strength according to Standard ISO 1421 met. 1,
- chemical resistance, in particular to dipping in acetone and hydrocarbons.

More specifically, "Tessuto tecnico 5186371 verde nero" (Green-black technical fabric 5186371) from Novurania has the following features:
- weight: 900+/−70 g/m2
- thickness: 0.75+/−0.15 mm
- warp/weft tensile strength: ≥3600/≥3200 N/5 cm
- warp/weft stretch at break: 20/29% with tolerance ±3/±5%
- warp/weft tear: >270/>206 N
- warp/weft adhesion: ≥65/≥65 N/5 cm
- flex life: no tear
- burning behavior: regulatory
- resistance to acetone dipping: resistant
- resistance to hydrocarbon dipping: resistant
- resistance to low temperature bending (−30° C. for 1 hour): resistant Moreover, the fabric insert of the "Tessuto tecnico 5186371 verde nero" (Green-black technical fabric 5186371) from Novurania has the following features:
- nature of the thread: PE
- weight: 230 g/m2

Moreover, the elastomer of the "Tessuto tecnico 5186371 verde nero" (Green-black technical fabric 5186371) from Novurania has the following features:
- polymer nature: CSM-IIR
- color: green (side A)-black (side B)

It is worth noting that the Applicant has observed that other variants in the coloring of the fabric "Tessuto tecnico 5186371 verde nero" (Green-black technical fabric 5186371) such as for example, beige, black, etc., have an equivalent technical effect on the protection of the window from solar radiation and in particular from UV rays. Alternatively, there may be provided for example, the product Polymar Hochglanz 8210 5240 (Mehgies Mehler Technologies) from Low & Bonar Italy srl, which substantially has features of:
- mechanical strength according to Standard ISO 1421 met. 1
- chemical resistance,
  - heat/cold resistance to temperature: −30 to +70° C.,
  - fastness to light, in particular to infrared radiation, for example according to Standard DIN EN ISO 105 B02>6.

A second thermally insulated layer 125, opposite to the first layer 123, designed to face a window. In other words, the second layer 125 has a thermally insulating action so as to thermally insulate the window which it is suitable for facing.

The second layer 125 may consist of by way of non-limiting example, the product "Polymar Polyfoam 3" from Low & Bonar Italy srl.

In particular, the product "Polymar Polyfoam 3" from Low & Bonar Italy srl has the following features:
- base fabric: PES
- thread count: 1100 dtex
- fabric construction: canvas 1/1
- type of coating: PVC
- total weight: 1300 g/m2
- warp/weft tensile strength: 3000/2800 N/50 mm
- warp/weft tearing strength: 300/300 N
- resistance to temperature: cold-resistance−10° C./heat-resistance+70° C.
- thermal conductivity (U value): 4 W/m2 K
- fastness to light>6
- adhesion: 15 N/cm
- folding strength: no cracks formed after 100,000 folds
- flame behavior: flame-retardant class 2, NFP 92507 M2
- finishing: lacquered on the right side In one variant, there may preferably also be an intermediate layer 124 (shown in FIG. 5) consisting of a resinated fabric, preferably wholly made of polyester (polyethylene terephthalate and polyethylene terephthalate copolymer). In other words, such an intermediate layer 124 made of resinated fabric is a breathable layer preferably made of non-woven fabric, which is suitable for incorporating air therein, for example in the shape of air locks.

The intermediate layer 124 may consist of by way of non-limiting example, the product "Olibond R Agu SM" from Ovattificio Olimpia S.a.s.

More specifically, the product "Olibond R Agu SM" from Ovattificio Olimpia S.a.s. has the following features:
- composition: 100% polyester (polyethylene terephthalate and polyethylene terephthalate copolymer)
- weight: from 120 to 800 g/m2
- width: from 200 to 300 cm
- package: rolls
- packaging: cardboard
- behavior to fire: class 1 IM according to Italian regulations
- washable in water
- main use: felt for spring mattresses and mattress cover Such three layers 123, 124 and 125 are joined together by means of sewing, using a sewing machine which is in itself known.

Figure 6:
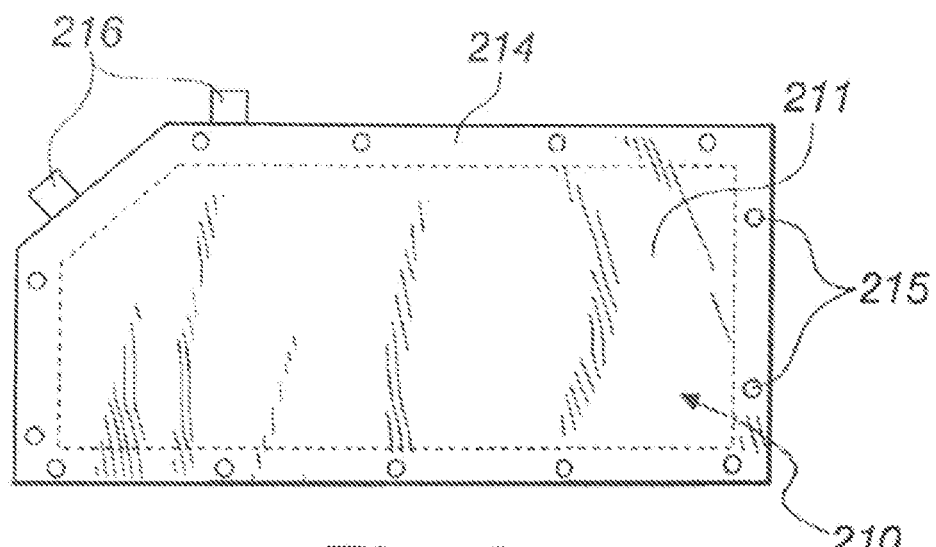
FIG. 6 depicts a view of a variant of a protective screen according to the invention.

With reference to FIG. 6, a variant of the screen according to the invention is indicated with reference number 210. Said protective screen 210 comprises a flexible protective sheet 211.

There are, on the peripheral flap 214 of said protective sheet 211, magnetic bodies 215 for connection with a metal frame of a window. The peculiarity of this variant consists of the presence of one or more tabs 216 positioned on the outer perimeter of said peripheral flap 214 and protruding therefrom. Said tabs 216 are made of stiff rubber (3800 grams per square meter) supplied by Low & Bonar srl, or similar, and are sewn to the outer edge of the peripheral flap 214. Said tabs 216 are adapted to be closed inside the vehicle. Said screen 210 may be arranged for example, on the window of a side door of a means with reinforced hinges, and said tabs 216 may be interlocked between the body and the door in closed configuration.

The composition of the protective screen 210 may be similar to that described above and identified in FIGS. 4 and 5.

Figure 7:
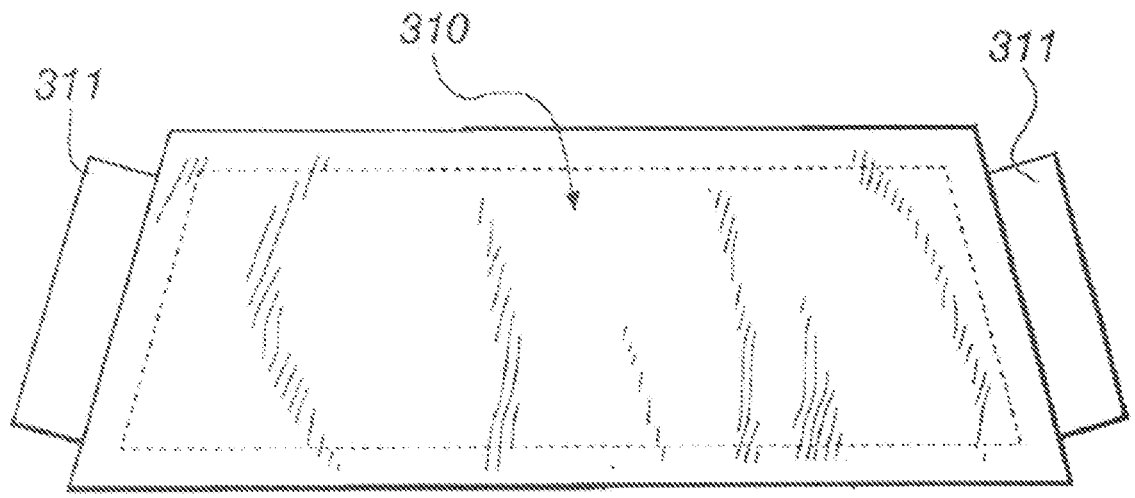
FIG. 7 depicts a view of a variant of a protective screen according to the invention.

In another variant depicted in FIG. 7, a screen according to the invention is indicated with reference number 310. Said screen consists of two layers: an outer layer made of fabric coated with PVC, for example of the type having 650 grams per square meter; an inner layer in contact with the window, made of thermally insulated fabric. The peculiarity of this variant is the presence of two wings 311 located at two opposite sides of screen 310. Said wings 311 are made in a single piece with the outer layer of PVC-coated fabric. Said wings are adapted to be interlocked inside the vehicle. Said screen 310 may be arranged for example, on the windshield and said wings 311 may be laterally interlocked between the body and the respective doors in closed configuration.

In a further variant, a screen according to the invention comprising the wings 311 consists of three layers formed like the above-mentioned layers 123, 124 and 125.

Figure 8:
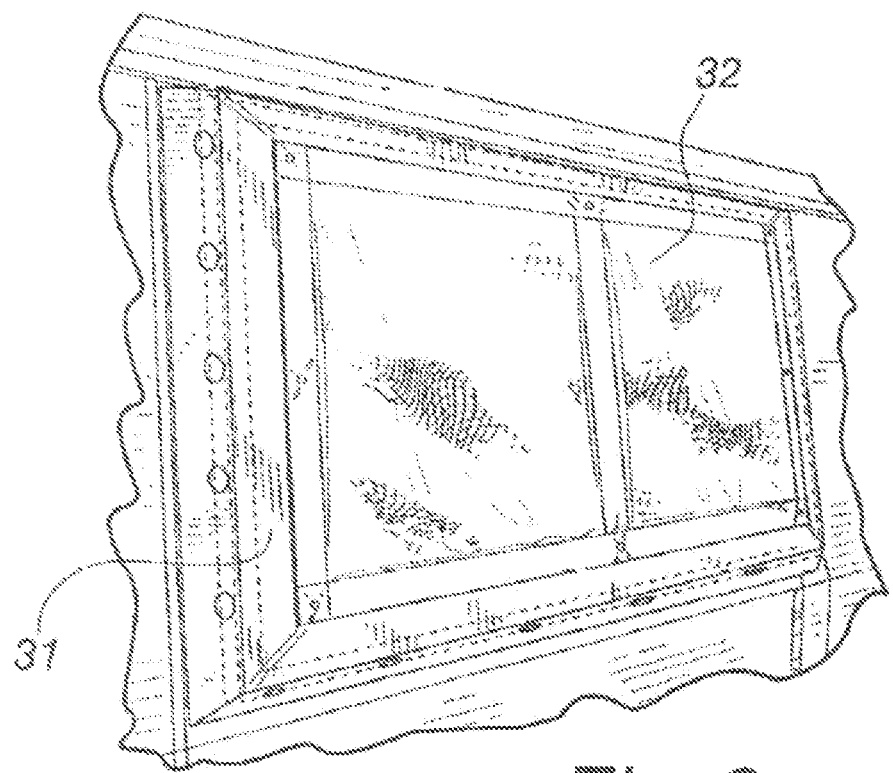
FIG. 8 depicts a front view of a further variant of a protective screen according to the invention.

A further variant (in FIG. 8) is suitable for the cases in which a metal grid 30 (e.g. a riot-control grid) is arranged on the window.

Figure 5:
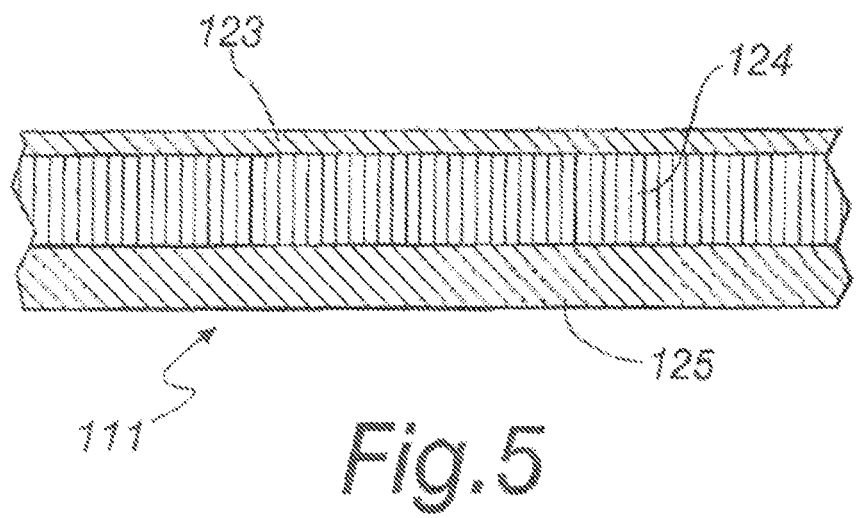
FIG. 5 depicts a cross-sectioned schematic view of a variant of a protective screen according to the invention.

Here, the protective screen provides:
- a peripheral frame 31 to be positioned on the frame of the grid and firmly fastened thereto;
- an inner detachable portion 32 consisting of a protective sheet 11, made according to the version indicated in FIG. 4 or in FIG. 5.

The component materials and fastening methods remain the same as those described above.

Figure 10:
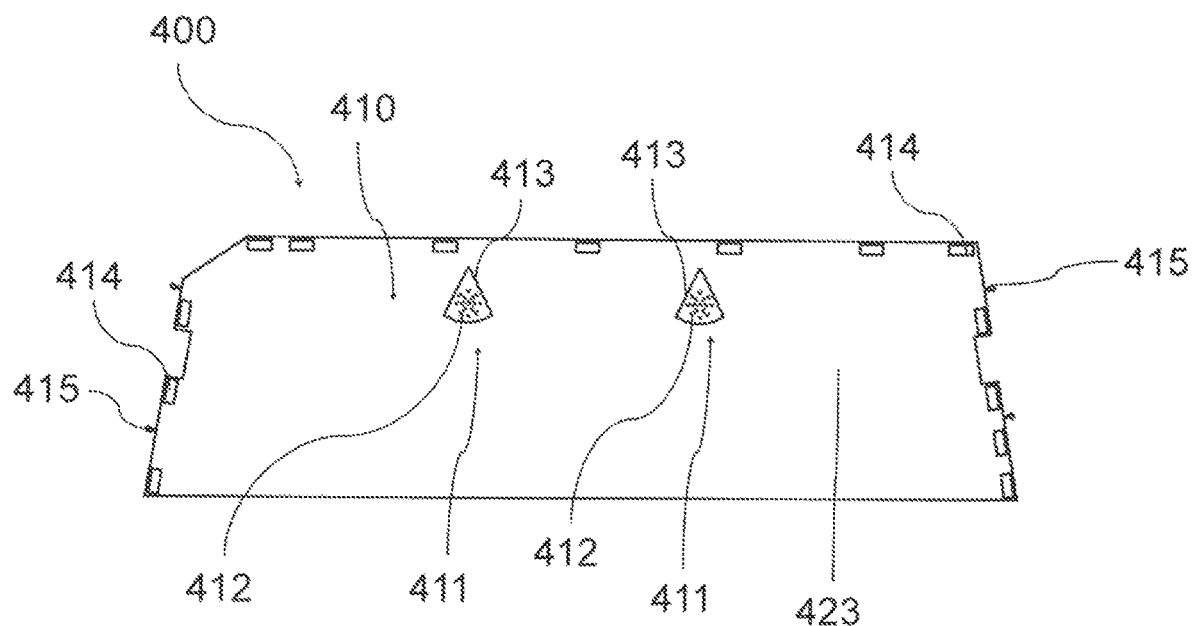
FIG. 10 depicts a plan front schematic view of a further embodiment of a protective screen according to the present invention.
Figure 11:
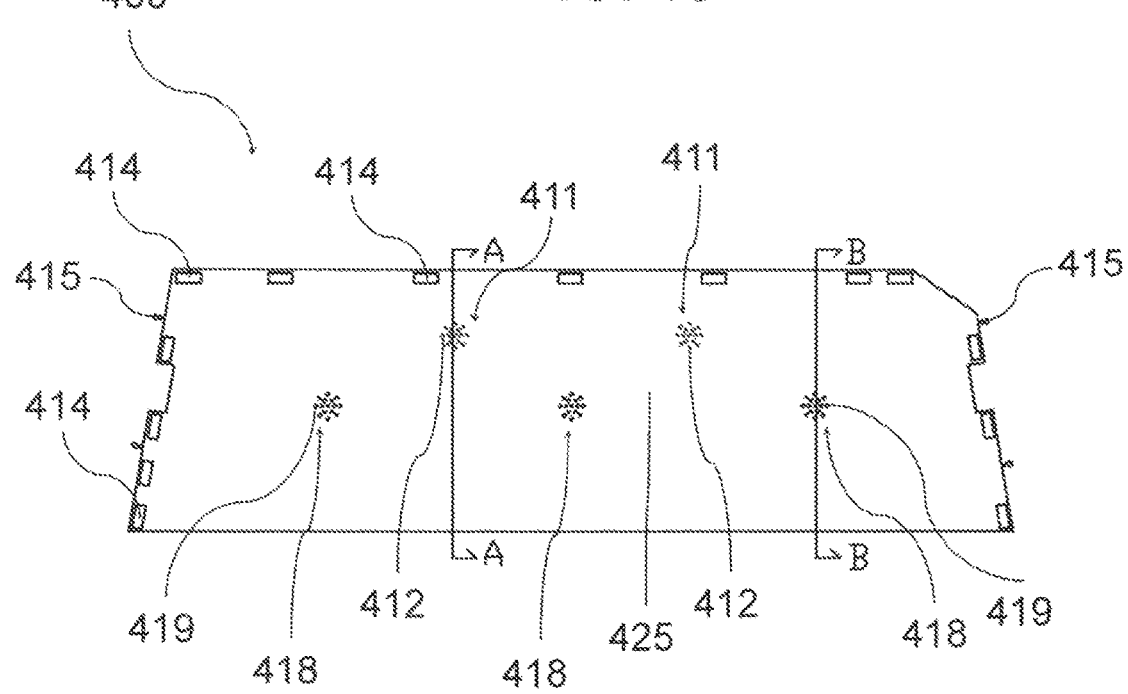
FIG. 11 depicts a plan rear schematic view of the protective screen in FIG. 10.

With reference to FIG. 10, a protective screen is shown according to a further embodiment, which is indicated as a whole with reference number 400. The protective screen 400 is suitable for protecting a window of a vehicle and more preferably, a ballistic window of a vehicle, from solar radiation. The protective screen 400 comprises a first layer 423, an intermediate layer 424 and a second layer 425. According to one embodiment, the first layer 423, the intermediate layer 424 and the second layer 425 are identical to the above-described first layer 123, to the intermediate layer 124 and to the second layer 125, respectively. According to one embodiment, screen 400 comprises a flexible sheet 410 comprising said layers 423 to 425. According to an advantageous embodiment, the protective screen comprises at least one element 411 for air circulation configured so as to allow a passage of air through the first layer 423, the intermediate layer 424 and the second layer 425. Thereby, the moisture between the second layer 425 and the vehicle window may advantageously be reduced when screen 400 is arranged on the vehicle under normal operating conditions. In this way the formation of condensation which may cause a deterioration of the window may accordingly be reduced. Indeed, the condensation which is formed on the window over time damages the seal around the window, thus allowing water to filter through the various layers forming the window, damaging them.

Figure 12:
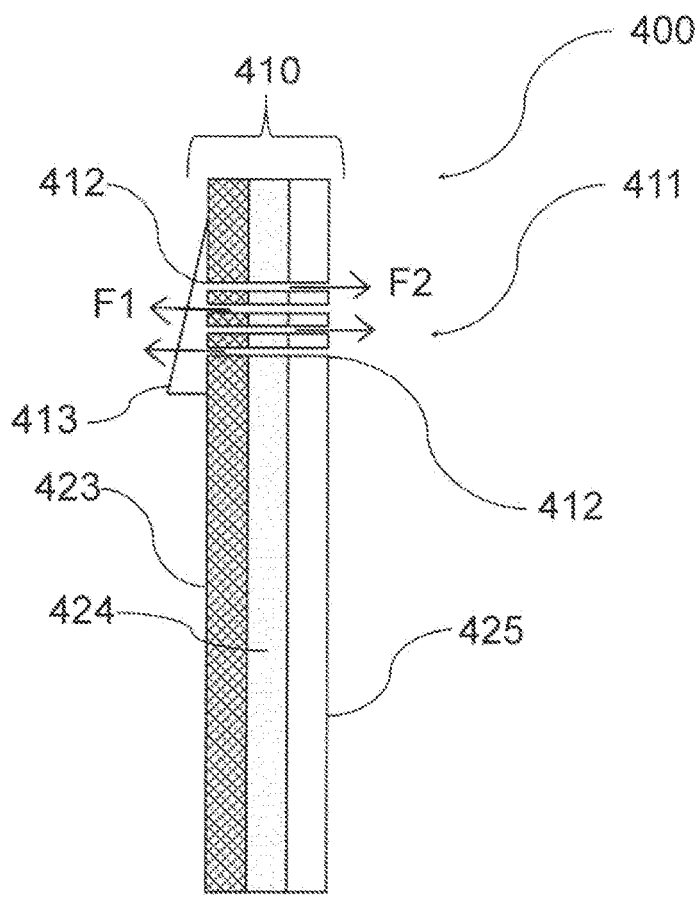
FIG. 12 depicts a plan schematic cross-sectioned view along line A-A in FIG. 11.

According to one embodiment, the at least one element 411 for air circulation comprises at least one series 411 of through openings 412 for the air circulation which cross the first layer 423, the intermediate layer 424 and the second layer 425. With reference to FIG. 12, arrows F1 and F2 indicate the circulation of the air through the through openings 412. According to one embodiment, the protective screen 400 comprises a plurality of series 411 of through openings 412 for air circulation. The protective screen 400 in the example comprises by way of non-limiting example, two series 411, each of which comprises a plurality of through openings 412 of air circulation, for example fifteen through openings 412. The through openings 412 preferably are micro holes 412 having by way of non-limiting example, a diameter equal to about 4 mm.

According to an advantageous embodiment, the at least one series 411 of through openings 412 for air circulation is arranged so as to facilitate the passage of hot air. In other words, the at least one series 411 is provided on an upper portion of the protective screen 400, i.e. on a portion of the protective screen 400 which is intended to face an upper portion of the window of the vehicle when screen 400 is applied to the vehicle. The moisture between screen 400 and the window may conveniently be more easily reduced due to such an arrangement of the at least one series 411 of through openings 412 because the hot air which physically tends to rise upwards may be easily evacuated through the openings 412.

According to one embodiment, the protective screen 400 comprises at least one rain-proof covering element 413 associated with the aforesaid at least one element 411 for air circulation. In the example, screen 400 not exhaustively comprises a rain-proof covering element 413 associated with each series 411 of through openings 412. According to one embodiment, the rain-proof covering elements 413 may be made by means of a covering portion 413, by way of non-limiting example made of PVC, which is arranged on the first layer 423 so as to cover the through openings 412 leaving a sufficient space for the passage of the air through the openings 412.

Figure 13:
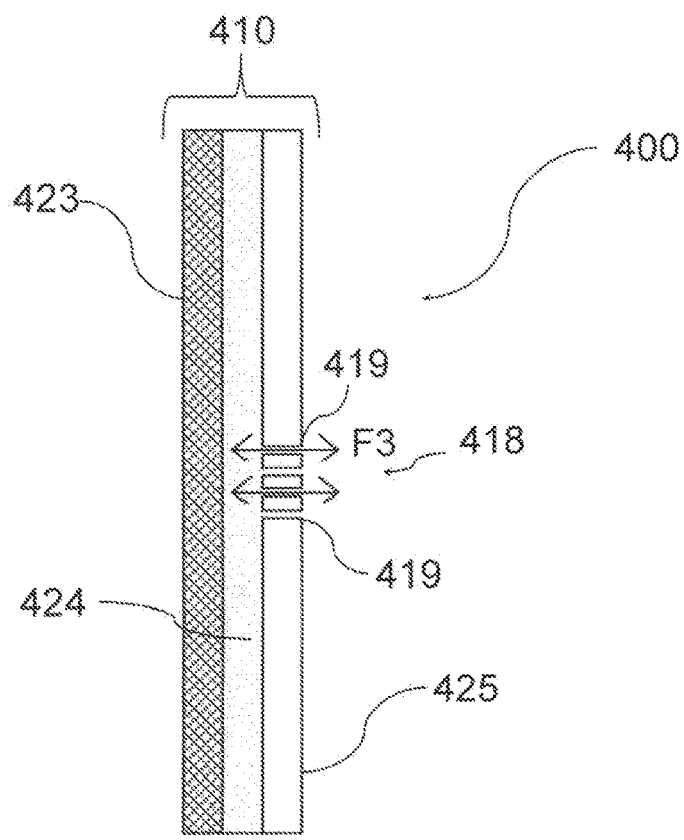
FIG. 13 depicts a plan schematic cross-sectioned view along line B-B in FIG. 11.

According to an advantageous embodiment, screen 400 comprises at least one self-ventilation element 418 configured so as to allow a passage of air through the intermediate layer 424 and outside the protective screen 400 through the second layer 425. This conveniently allows improving the cooling of the protective screen 400 and therefore further reducing the risk of damaging the window of the vehicle. According to one embodiment, this is made possible by the fact that the intermediate layer 424 is made of a breathable resinated fabric as described above with reference to the intermediate layer 124. According to one embodiment, the at least one self-ventilation element 418 comprises at least one series 418 of self-ventilation through openings 419 which are provided only in the second layer 425. The passage is indeed possible, by means of such through openings 419, of an air flow (indicated by the double arrows F3 in FIG. 13) between the intermediate layer 424, inside of which there may be stored air in the shape for example, of airlocks, and outside screen 400. According to one embodiment, the protective screen 400 comprises a plurality of series 418, in the non-limiting example three series 418, each of which comprises a plurality of through openings 419, by way of non-limiting example, 15 through openings 419.

According to a convenient embodiment, the protective screen 400 comprises vehicle fastening means including magnetic bodies 414. According to an advantageous embodiment, the magnetic bodies 414 comprise a plurality of permanent magnets 414, in the non-limiting example fourteen permanent magnets 414, which are incorporated in the thickness of the protective screen 400. Conveniently, this allows avoiding the body or other parts of the vehicle from being scratched during the removal of the tarp from the window of the vehicle. This aspect is particularly important in the case of certain types of very tall tactical military vehicles (for example also 3 or 4 meters tall) in which the removal of screen 400 is relatively difficult. Indeed, the body of such vehicles typically is painted with special paints, for example adapted to prevent the settling of chemical components on the body of the vehicle, and it is therefore important to avoid the undesired removal thereof during the removal of screen 400 from the window of the vehicle. According to a convenient embodiment, the permanent magnets 414 are permanent magnets made of neodymium. This advantageously allows ensuring a particularly effective fastening of screen 400 to the vehicle also if there are provided permanent magnets 414 incorporated in the thickness of screen 400.

According to one embodiment, the fastening means of screen 400 also comprise slots 415 which may be for example, identical to the slots 23 described above.

Figure 14:
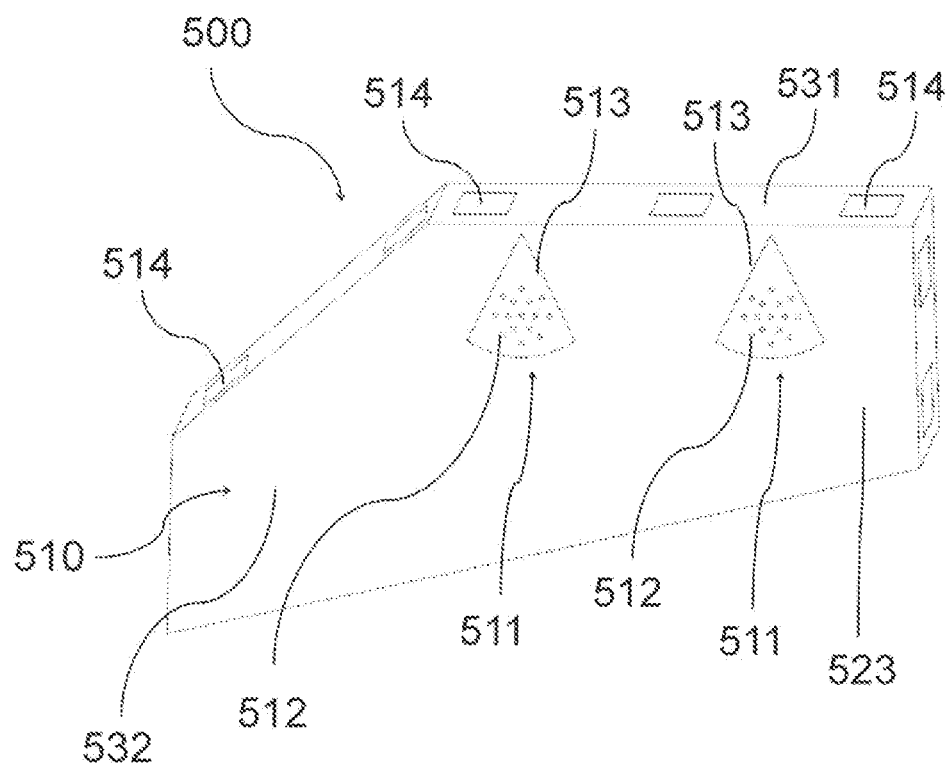
FIG. 14 depicts a perspective and schematic view from the front side of a further embodiment of a protective screen according to the present invention.
Figure 15:
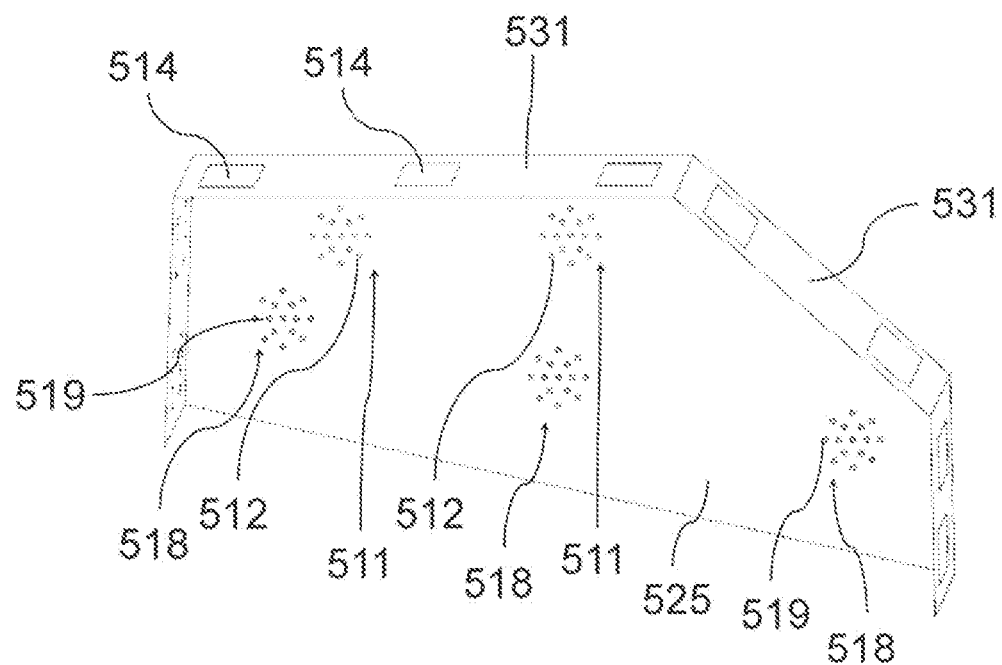
FIG. 15 depicts a perspective and schematic view from the rear side of the protective screen in FIG. 14.

With reference to FIGS. 14 and 15, there is shown a further embodiment of a protective screen according to the invention, which is indicated as a whole with reference number 500.

Figure 9:
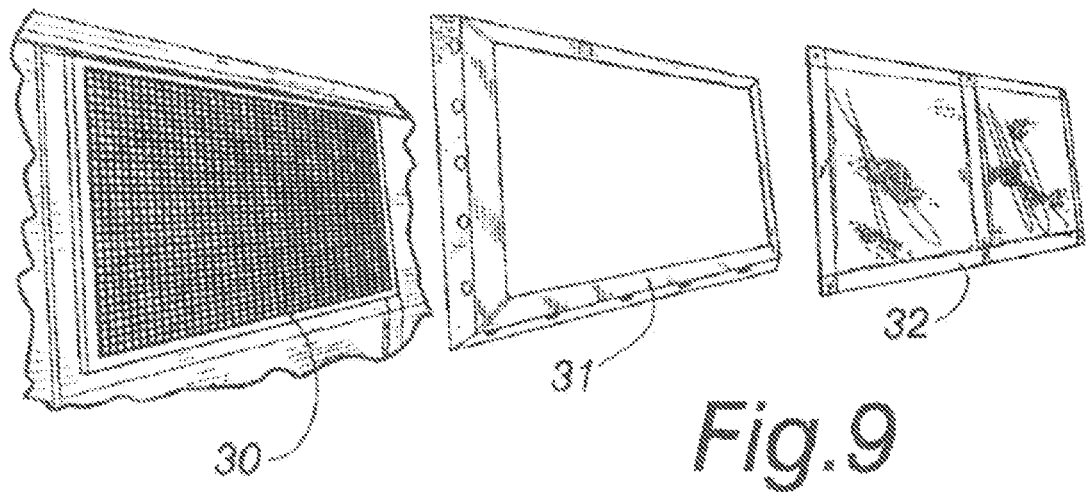
FIG. 9 is an exploded view of the components of the embodiment in FIG. 8.

According to one embodiment, the protective screen 500 comprises a flexible sheet 510. According to one embodiment, apart from the shape, the flexible sheet 510 is structurally identical to the flexible sheet 410 described above. In particular, the flexible sheet 510 preferably comprises a first layer 523, an intermediate layer (not depicted) and a second layer 525, which are identical to the above-described first layer 423, to the intermediate layer 424 and to the second layer 425, respectively. The protective screen 500 comprises a peripheral frame 531 configured so as to be positioned on a riot-control grid arranged on a window of the vehicle and in such a manner as to be firmly fastened to such grid. Moreover, the protective screen 500 comprises an inner portion 532 which comprises or consists of the flexible sheet 510. The protective screen 500 practically differs from the above-described embodiment with reference to FIGS. 8 and 9 mainly for the fact that the peripheral frame 531 and the inner portion 532 are made in a single piece. In other words, unlike the solution described with reference to FIGS. 8 and 9, the peripheral frame 531 and the inner portion 532 cannot be detached from each other. According to one embodiment, the protective screen 500 comprises at least one element 511 for air circulation which is identical to the above-described at least one element 411 for air circulation. In other words, the at least one element 511 may comprise at least one series 511 of through openings 512 for air circulation, which are identical to the openings 412. Moreover, there may be provided at least one rain-proof covering element 513 which is identical to the at least one element 413 associated with the aforesaid at least one element 511 for air circulation. According to one embodiment, the protective screen 500 comprises at least one self-ventilation element 518 which is identical to the above-described at least one self-ventilation element 418. In other words, the at least one self-ventilation element 518 may comprise at least one series 518 of self-ventilation through openings 519 which are only provided in said second layer 525 and are identical to the through openings 419 described above.

According to a convenient embodiment, the protective screen 500 comprises a plurality of permanent magnets 514 which are identical to the permanent magnets 414. Preferably, the magnets 514 are arranged along the peripheral frame 531. Preferably, the magnets 514 are incorporated in the thickness of screen 500.

Figure 16:
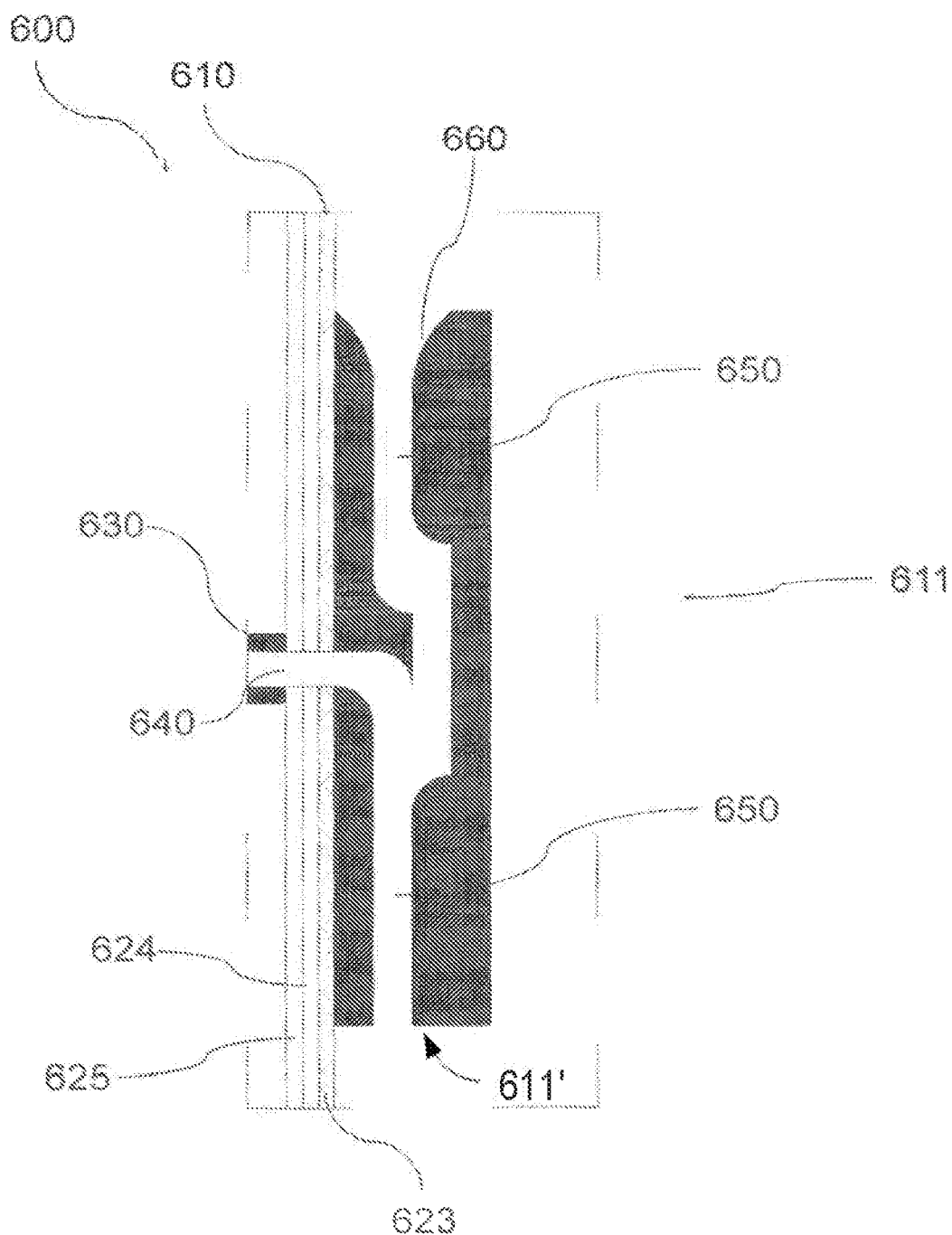
FIG. 16 depicts a plan schematic cross-sectioned view of a variant of the screen in FIG. 10.

With reference to FIG. 16, there is shown a further embodiment of a protective screen according to the invention, which is indicated as a whole with reference number 600.

According to one embodiment, the protective screen 600 comprises a flexible sheet 610. According to one embodiment, the flexible sheet 610 is structurally substantially identical to the flexible sheet 410 described above. In particular, the flexible sheet 610 preferably comprises a first layer 623, an intermediate layer 624 and a second layer 625, which are identical to the above-described first layer 423, to the intermediate layer 424 and to the second layer 425, respectively. Screen 600 practically differs from screen 400 for the fact of providing at least one element 611 for air circulation which may be provided in addition or alternatively to the at least one element 411 for air circulation. The at least one element 611 for air circulation is configured so as to allow a passage of air through the first layer 623, the intermediate layer 624 and the second layer 625. According to a convenient embodiment, the at least one element 611 for air circulation comprises at least one valve 611' for air circulation coupled to the flexible sheet 610. According to one embodiment, the at least one valve 611' is arranged on the side of the first layer 623, or in any case so as to mainly extend from the side of the first layer 623, and preferably is fastened to the flexible sheet 610 by means of a suitable fastening element 630, such as by way of non-limiting example, a fastening ring nut 630. The at least one valve 611' preferably defines a first channel 640 for the passage of the air which crosses said layers 623, 624, 625. According to a convenient embodiment, valve 611' also defines a second channel 650 for the passage of air, which is arranged transversely and more preferably substantially orthogonal to the first channel 640. The at least one valve 611' is conveniently configured so as to also provide a rain-proof protection. The first and the second channel 640, 650 conveniently allow the air circulation through valve 611', and the second channel 650 is configured so as to allow the outflow of the rainwater without the latter being channeled into the first channel 640. According to one embodiment, the at least one valve 611' is also provided with a portion 660 configured so as to cause a "Venturi" effect.

In general, according to one embodiment, the at least one valve 611' would be self-protected in the case of rain, and holed/shaped according to the specific oblique/vertical positioning needs and would also be provided with such a shape so as to use the "Venturi" effect.

It is worth noting that the various elements of all the embodiments of a protective screen for vehicle windows which have been described above are to be considered in general freely combinable with one another unless it is not apparent from the description that two or more such elements are incompatible with one another.

It practically has been ascertained how the invention reaches the selected task and objects.

In particular, the invention has fine-tuned a protective screen for vehicle windows, and in particular for windows of military vehicles, which by preventing the visible radiation (UV rays) from reaching the stratified window, limits the failures and deformations thereof, for example of a vehicle exposed for lengthy periods to medium-to-high temperatures, such as a military vehicle in a desert area.

The protective screen also prevents the transparency and clarity of the crystal glass from being compromised, to the complete advantage of the safety of the driver operator.

A protective screen according to the invention may obviously also be implemented at low temperatures with the advantage of making the vehicle to which windshield or other window it is applied immediately usable without the need to remove the ice which could be formed on the window itself.

Moreover, the invention has fine-tuned a protective screen which is easy to be positioned in use to cover a window of a vehicle, and is just as easy to be removed due to the fastening system based on the implementation of magnetic bodies, slots and elastic cords with end hooks, tabs and wings.

Moreover, the invention has fine-tuned a protective screen which can be stored with reduced volume, given that the protective screen is easy to be folded.

The invention thus conceived is susceptible to numerous modifications and variations, all falling within the scope of the inventive concept, moreover, all the details may be replaced by other technically equivalent elements.

So long as they are compatible with the specific use, practically any materials, as well as any dimensions and contingent shapes may be used, according to the needs and the background art.

Where the features and techniques mentioned in any claim are followed by reference marks, such marks were only used for the purpose of increasing the intelligibility of the claims and accordingly, such reference marks have no limiting effect on the interpretation of each element identified by way of example by such reference marks.

The invention claimed is:

1. A protective screen for vehicle windows, comprising:
a flexible protective sheet including a vehicle fastener, wherein said flexible protective sheet comprises:
a first outer layer, resistant to heat/cold, mechanical and chemical stresses, UV ray-shielding and having fastness to light,
a second layer made of thermally insulative fabric, designed to face a window; and
an intermediate layer between the first outer layer and the second layer, wherein the intermediate layer is made of resinated fabric and said protective screen comprises at least one self-ventilation element configured so as to allow a passage of air between said intermediate layer and outside of the protective screen, through said second layer.

2. The protective screen for vehicle windows according to claim 1, wherein said first layer substantially has a chemical resistance.

3. The protective screen for vehicle windows according to claim 1, wherein said first layer is made of an elastomeric protective technical fabric having technical features comprising:
warp tensile strength: ≥3600 N/5 cm;
weft tensile strength: ≥3200 N/5 cm;
warp stretch at break: 20% with tolerance ±3%;
weft stretch at break: 29% with tolerance ±5%; and
a chemical resistance to dipping in acetone and hydrocarbons.

4. The protective screen for vehicle windows of claim 1, wherein said first layer substantially has features of:
cold resistance to −30° C.;
heat resistance to +70° C.; and
fastness to light >6, according to Standard DIN EN ISO 105 B02.

5. The protective screen for vehicle windows according to claim 1, wherein said second layer is made of a polyester woven fabric having technical features comprising: warp tensile strength: 3000 N/50 mm;
weft tensile strength: 2800 N/50 mm;
warp tearing strength: 300 N;
weft tearing strength: 300 N;
cold-resistance to −10° C.;
heat resistance to +70° C.; and
fastness to light >6, according to Standard DIN EN ISO 105 B02.

6. The protective screen for vehicle windows according to claim 1, wherein said intermediate layer is made of polyester.

7. The protective screen for vehicle windows according to claim 1, wherein said intermediate layer comprises polyester having a weight: from 120 to 800 g/m$^2$.

8. The protective screen according to claim 1, wherein said fastener consists of magnetic bodies.

9. The protective screen according to claim 1, wherein a metal grid is arranged on the vehicle window and said protective screen has a peripheral frame configured to be positioned on a frame of said metal grid and to be firmly fastened thereto, and a detachable portion of the flexible protective sheet within said peripheral frame.

10. The protective screen according to claim 1, wherein said at least one element for air circulation comprises at least one series of through openings for air circulation which cross said first outer layer, said intermediate layer and said second layer.

11. The protective screen according to claim 1, comprising at least one rain-proof covering element associated with said at least one element for air circulation.

12. The protective screen according to claim 1, wherein said at least one self-ventilation element comprises at least one series of self-ventilation through openings which are provided only in said second layer.

13. A protective screen for vehicle windows, comprising:
a flexible protective sheet including a vehicle fastener, wherein said flexible protective sheet comprises:
a first outer layer, resistant to heat/cold, mechanical and chemical stresses, UV ray-shielding and having fastness to light, a second layer made of thermally insulative fabric, designed to face a window;

an intermediate layer between the first outer layer and the second layer, wherein the intermediate layer is made of resinated fabric; and at least one element for air circulation configured so as to allow a passage of air through said first outer layer, said intermediate layer and said second layer, wherein said at least one element for air circulation comprises at least one valve for air circulation coupled to said flexible sheet, wherein said valve is configured to allow air to pass through the flexible protective sheet and rainwater to pass through said valve without the rainwater interfering with the passage of air.

14. A protective screen for vehicle windows, comprising:
a flexible protective sheet including a vehicle fastener, wherein said flexible protective sheet comprises:
  a first outer layer, resistant to heat/cold, mechanical and chemical stresses, UV ray-shielding and having fastness to light,
  a second layer made of thermally insulative fabric, designed to face a window;
  an intermediate layer between the first outer layer and the second layer, wherein the intermediate layer is made of resinated fabric; and
at least one element for air circulation configured so as to allow a passage of air through said first outer layer, said intermediate layer and said second layer, wherein the at least one element for air circulation comprises at least one series of through openings for air circulation which cross the first layer, the intermediate layer and the second layer;
wherein said through openings for air circulation comprise micro holes and are provided on an upper portion of said protective screen which covers an upper portion of a window of the vehicle when said protective screen is applied to the vehicle so as to facilitate passage of hot air.

15. A protective screen for vehicle windows, comprising:
a flexible protective sheet including a vehicle fastener, wherein said flexible protective sheet comprises:
  a first outer layer, resistant to heat/cold, mechanical and chemical stresses, UV ray-shielding and having fastness to light,
  a second layer made of thermally insulated fabric, designed to face a window,
wherein a metal grid is arranged on the vehicle window and said protective screen has a peripheral frame configured to be positioned on a frame of said metal grid and to be firmly fastened thereto, and a detachable portion of the flexible protective sheet within said peripheral frame.

16. The protective screen for vehicle windows according to claim 15, comprising: an intermediate layer made of resinated fabric between the first outer layer and the second layer.

17. The protective screen for vehicle windows according to claim 15, wherein said first layer substantially has a chemical resistance.

18. The protective screen for vehicle windows according to claim 15, wherein said first layer is made of an elastomeric protective technical fabric having technical features comprising:
  warp tensile strength: ≥3600 N/5 cm;
  weft tensile strength: ≥3200 N/5 cm;
  warp stretch at break: 20% with tolerance ±3%;
  weft stretch at break: 29% with tolerance ±5%; and
  a chemical resistance to dipping in acetone and hydrocarbons.

19. The protective screen for vehicle windows of claim 15, wherein said first layer substantially has features of:
  cold resistance to −30° C.;
  heat resistance to +70° C.; and
  fastness to light >6, according to Standard DIN EN ISO 105 B02.

20. The protective screen for vehicle windows according to claim 15, wherein said second layer is made of a polyester woven fabric having technical features comprising:
  warp tensile strength: 3000 N/50 mm;
  weft tensile strength: 2800 N/50 mm;
  warp tearing strength: 300 N;
  weft tearing strength: 300 N;
  cold-resistance to −10° C.;
  heat resistance to +70° C.; and
  fastness to light >6, according to Standard DIN EN ISO 105 B02.

21. The protective screen for vehicle windows according to claim 16, wherein said intermediate layer is made of polyester.

22. The protective screen for vehicle windows according to claim 16, wherein said intermediate layer comprises polyester having a weight: from 120 to 800 g/m².

23. The protective screen according to claim 15, wherein said fastener consists of magnetic bodies.

24. The protective screen according to claim 16, wherein at least one element for air circulation comprises at least one series of through openings for air circulation which cross said first outer layer, said intermediate layer and said second layer.

25. The protective screen according to claim 15, comprising at least one rain-proof covering element associated with said at least one element for air circulation.

26. The protective screen according to claim 15, wherein said at least one self-ventilation element comprises at least one series of self-ventilation through openings which are provided only in said second layer.

* * * * *